US006631666B2

(12) United States Patent
Cahuzac

(10) Patent No.: US 6,631,666 B2
(45) Date of Patent: Oct. 14, 2003

(54) DEVICE FOR CONSTRUCTING A BRAIDED TUBULAR STRUCTURE

(75) Inventor: Georges Jean Joseph Antoine Cahuzac, Le Bouscat (FR)

(73) Assignee: Aerospatiale Societe Nationale Industrielle, Paris (FR)

(*) Notice: Subject to any disclaimer, the term of this patent is extended or adjusted under 35 U.S.C. 154(b) by 0 days.

(21) Appl. No.: 10/207,211

(22) Filed: Jul. 30, 2002

(65) Prior Publication Data

US 2003/0017290 A1 Jan. 23, 2003

Related U.S. Application Data

(62) Division of application No. 08/942,326, filed on Oct. 1, 1997.

(30) Foreign Application Priority Data

Oct. 1, 1996 (FR) .............................. 96 11944

(51) Int. Cl.[7] .................................................. D04C 3/24
(52) U.S. Cl. ...................... 87/16; 87/30; 87/34; 87/35; 87/37
(58) Field of Search ................. 87/16, 28, 29, 87/30, 33, 34, 35, 37, 62; 26/33, 34, 35

(56) References Cited

U.S. PATENT DOCUMENTS 5,067,525 A * 11/1991 Tsuzuki et al. ................ 139/11
5,348,056 A * 9/1994 Tsuzuki .................... 139/384 R
5,476,027 A * 12/1995 Uchida et al. .................. 87/29

FOREIGN PATENT DOCUMENTS

JP          02264055 A  * 10/1990  ............ D04C/3/00

* cited by examiner

Primary Examiner—John J. Calvert
Assistant Examiner—Shaun R Hurley
(74) Attorney, Agent, or Firm—Fisher, Christen & Sabol

(57) ABSTRACT

A machine, for the construction of a braid (11), that includes a set of identical multiindented wheels (2), which are mounted on a fixed support (1) and driven in rotation to cause the circulation of spindles (6) carrying spools (7) of braiding threads (8). The multiindented wheels are disposed in parallel and equidistant lines (L—L). In the set of multiindented wheels:

the multindented wheels (2) belonging to a line are spaced from one another, so that two consecutive multiindented wheels belonging to one and the same line cannot cooperate directly with one another; and a multiindented wheel (2) belonging to one line is disposed between two multiindented wheels belonging to an adjacent line and cooperates with the two multiindented wheels, In the spaces between the consecutive multiindented wheels of a line, there are provided passages (3) for the longitudinal elongate elements (9) of the braided tubular structure.

10 Claims, 16 Drawing Sheets

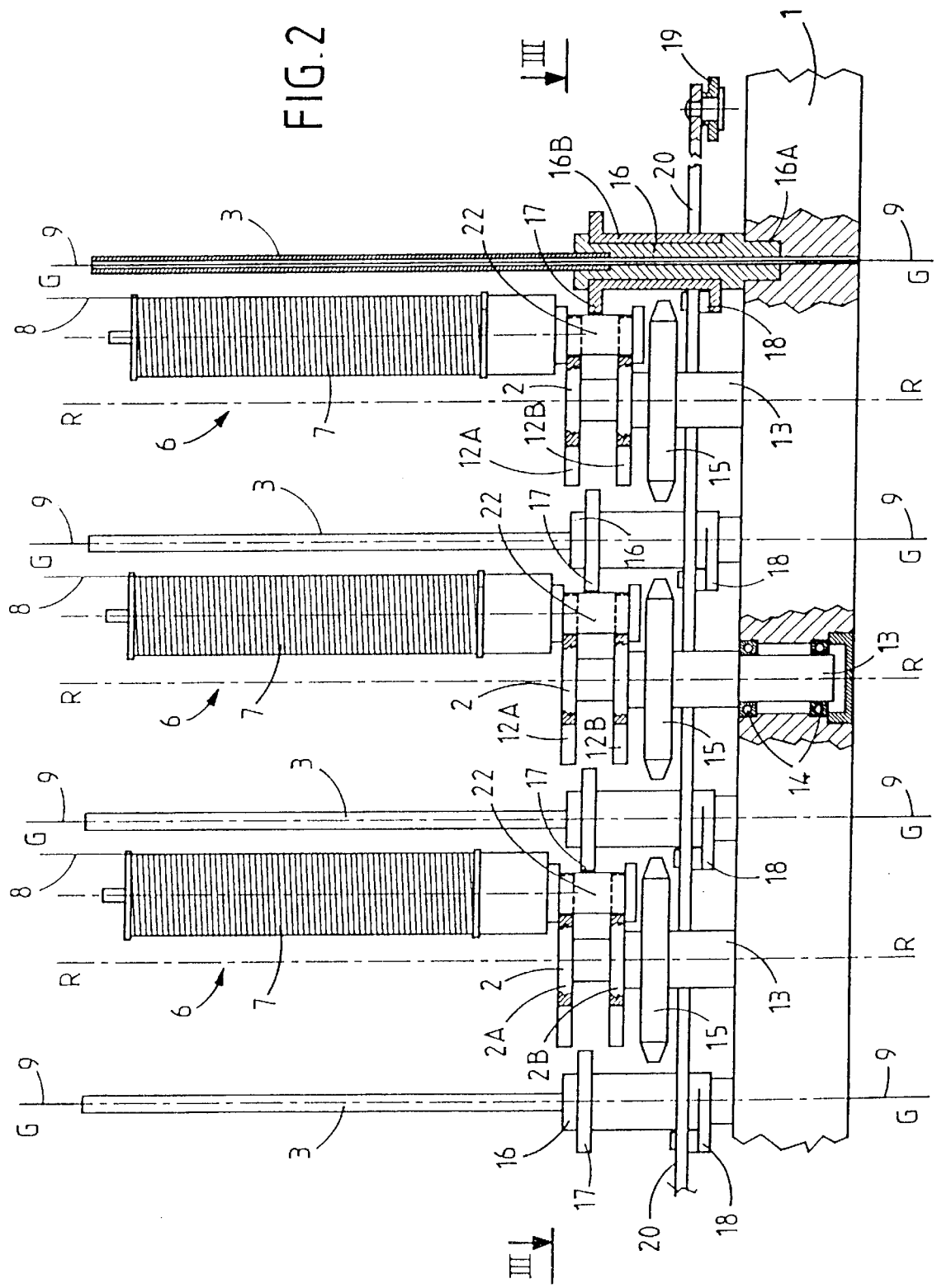

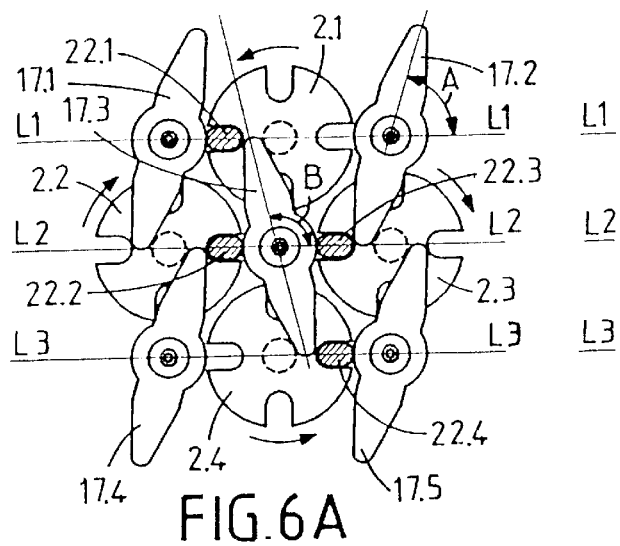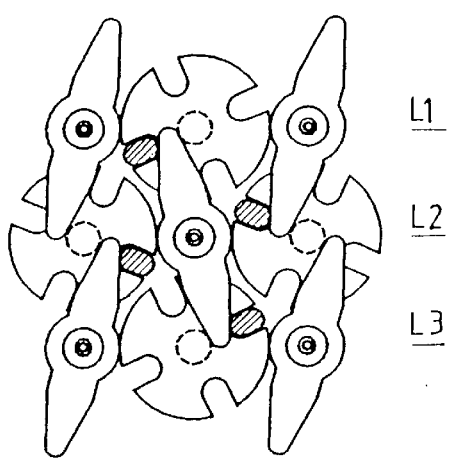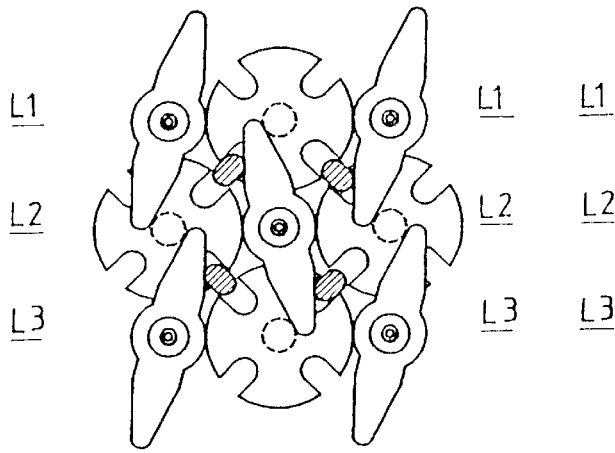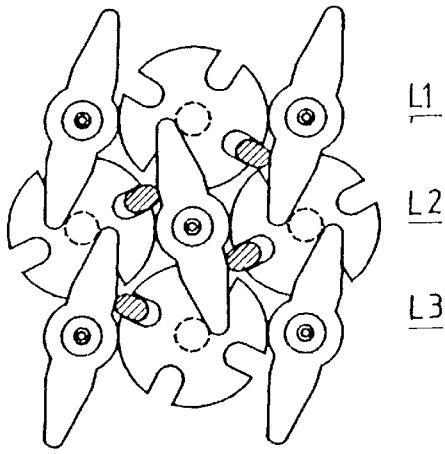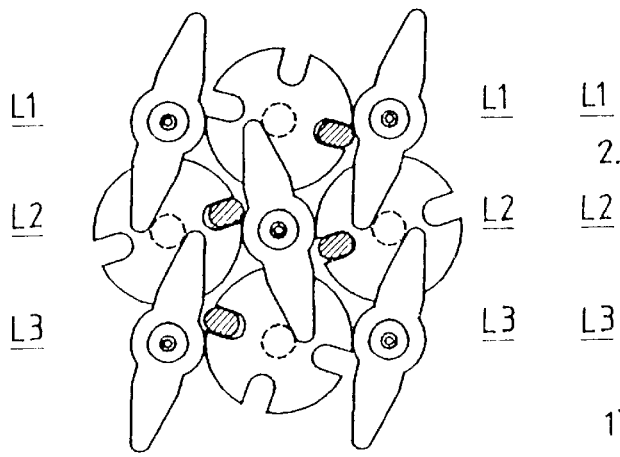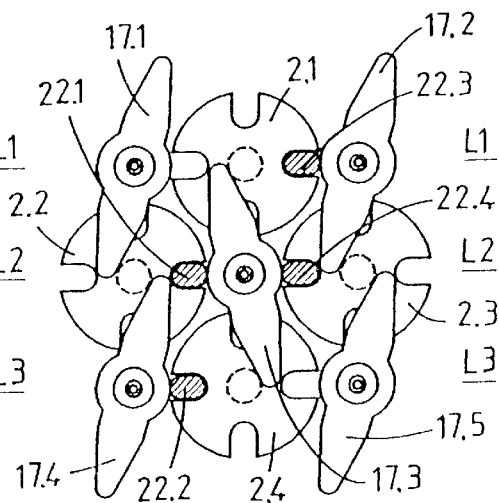

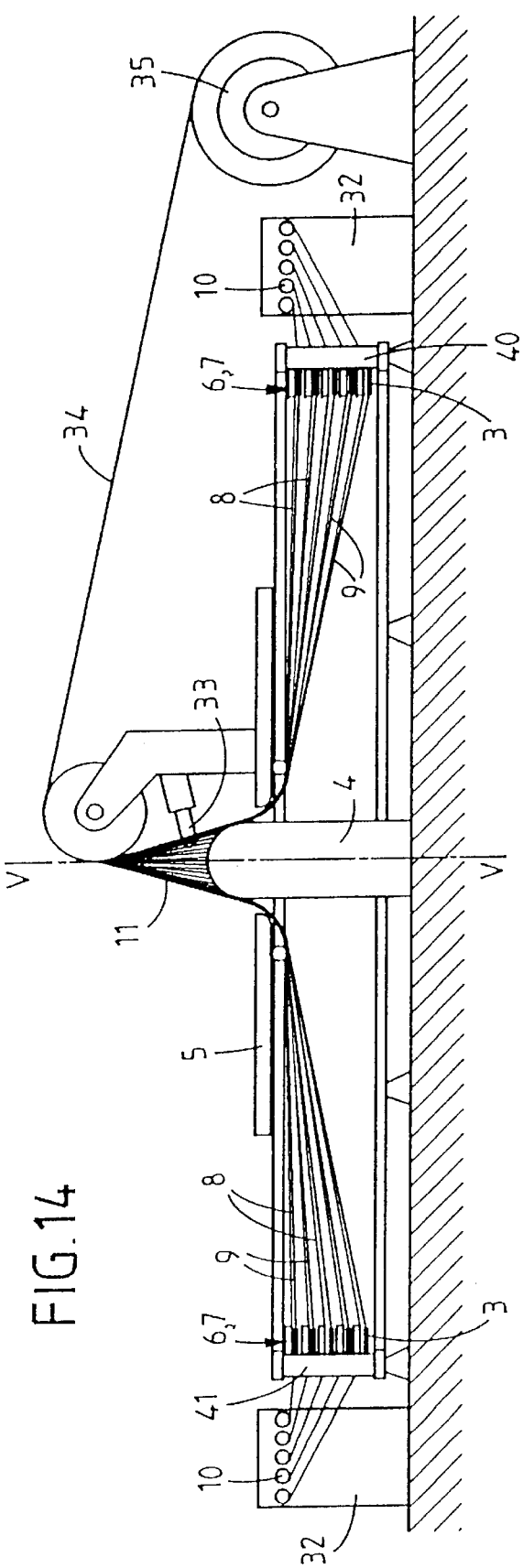

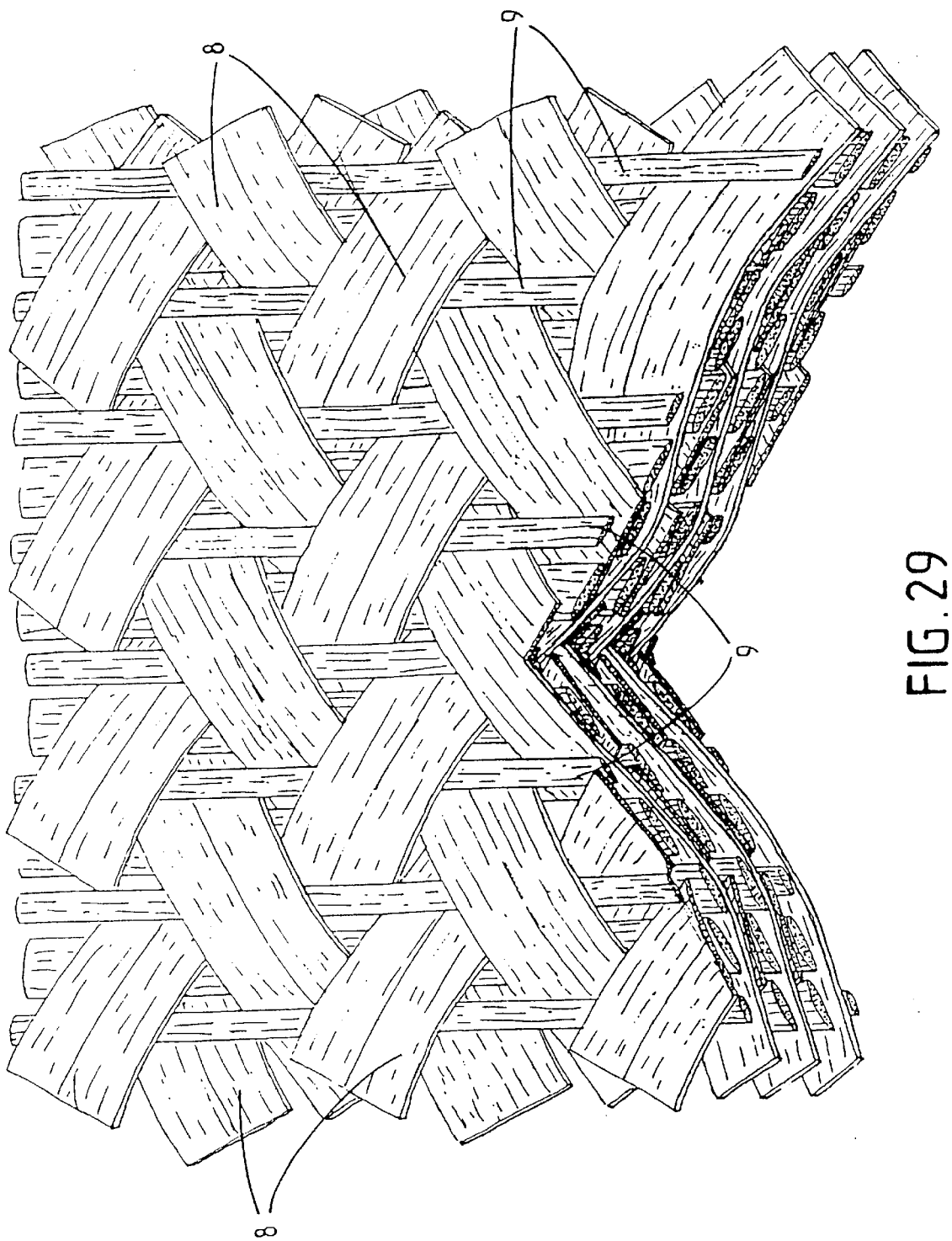

DEVICE FOR CONSTRUCTING A BRAIDED TUBULAR STRUCTURE

This application is a divisional of U.S. patent application Ser. No. 08/942,326, which was filed Oct. 1, 1997.

The present invention relates to braided tubular structures, processes and machines for manufacturing them, and their applications in the construction of plane armorings for composite material.

European Patent EP-A-0 113 196 has already disclosed a braided (and nonwoven) tubular structure, which is intended to form a composite tubular part after impregnation with resin and polymerization of the latter. This tubular structure includes longitudinal threads (parallel to the axis of said structure) and helicoidal braiding threads forming two grids of directions oblique in relation to said longitudinal threads, said braiding threads being interlaced with one another, as well as with said longitudinal threads. These longitudinal threads are distributed on a plurality of collars coaxial with the structure and the helicoidal braiding threads follow paths which cause them to pass between the longitudinal threads of one or of a plurality of concentric collars, these paths being such that the projections of said braiding threads onto a plane orthogonal to the axis of the tubular structure are broken lines, all the sections of which are oblique in relation to the thickness of the wall of said tubular structure.

It is possible in this way to obtain braided tubular structures of considerable wall thickness. However, in spite of this, the mechanical wall characteristics of the tubular composite parts constructed from these tubular structures are relatively low, since these tubular structures exhibit numerous voids due to the intersections of the paths of the helicoidal threads of one and the same direction.

The object of the present invention is to remedy this disadvantage.

To this end, according to the invention, the braided tubular structure including longitudinal elongate elements distributed on a plurality of collars coaxial with the structure and braiding threads forming two grids of directions oblique in relation to said longitudinal elongate elements and interlaced with said longitudinal elongate elements, said braiding threads following paths which cause them to pass between said longitudinal elongate elements, is noteworthy in that said braiding threads of each one of said grids form an assembly of superposed layers in which said braiding threads are parallel from one layer to the next.

Thus, said parallel braiding threads, which form layers which are superposed in the direction of the thickness of the wall of said tubular structure, permit the minimization of the intersections and thus the imparting of excellent mechanical properties to said wall.

Said longitudinal elongate elements may be threads as in the European Patent identified hereinabove. They may likewise be composed of thread rovings, of cables, of rods, of tubes, etc . . .

In order to be able to construct such a tubular structure, it is advantageous, in accordance with the present invention, to braid it by means of a plurality of braiding threads which are wound off from so many spools which are displaceable through a succession of elementary paths that said braiding threads should become interlaced with elongate elements which are parallel to one another and distributed on a plurality of coaxial collars. According to the invention, this process is noteworthy in that said spools are displaced with the aid of three types of elementary paths, that is to say first elementary paths of direction orthogonal in relation to said coaxial collars, second elementary paths of direction circumferential in relation to the latter and third elementary paths, each one of which associates a first and a second elementary path inter se.

Thus, said first elementary paths permit said braiding threads to be caused to pass around said elongate elements of different collars, that is to say within the thickness of the wall of said tubular structure, while said circumferential second paths permit the constitution of said superposed layers formed of threads which are parallel from one layer to the next.

It will be noted that, by varying the sequence of said elementary paths, it is possible to vary the braiding "mesh". Since numerous sequences of different elementary paths are possible, by virtue of the invention, it is possible to obtain a large number of different "meshes" for the tubular structure of the present invention.

For the implementation of such a process, the present invention advantageously provides a braiding machine including a set of identical multiindented wheels, mounted on a fixed support and driven in rotation to cause the circulation of spindles carrying spools of braiding threads, said multiindented wheels being disposed in parallel and equidistant lines. In order to be capable of executing the three types of elementary paths which are characteristic of said process, this machine is, according to the invention, noteworthy:

in that, in said set of multiindented wheels:
the multiindented wheels belonging to a line are spaced from one another, so that two consecutive multiindented wheels belonging to one and the same line cannot cooperate directly with one another;
a multiindented wheel belonging to one line is disposed between two multiindented wheels belonging to an adjacent line and cooperates with said two multiindented wheels; and
in that, in the spaces between the consecutive multiindented wheels of a line, there are provided passages for said longitudinal elongate elements of said braided tubular structure.

The result is accordingly a quincuncial arrangement for the multiindented wheels and for said passages, said quincunces of multiindented wheels being overlapped with said quincunces of said passages. Within such quincunces, the distance between the centers of two consecutive multiindented wheels of a line is equal to the distance between two consecutive passages of a line, these distances being equal to twice the distance between two adjacent lines of multiindented wheels and of passages.

By virtue of such a quincuncial arrangement, it is possible to cause the circulation of said spindles transversely and parallel to said lines of multiindented wheels, and also to cause them to turn about the center of a multiindented wheel, so that it is possible to execute the three types of elementary paths mentioned hereinabove.

To do this, according to another feature of the present invention, in said spaces between the consecutive multiindented wheels of a line, there are further provided rhomboidal needles of controlled orientation which are intended to direct said spindles to cause them to pass from one multiindented wheel to another belonging to an adjacent line (first and second elementary paths) or to maintain them on their respective multiindented wheels (third elementary paths).

Preferably, said needles are coaxial with said passages for the elongate elements, so that they likewise form quincunces, which are superposed upon those of said passages.

Said needles can be controlled in orientation by a linkage gear.

Preferably, at each instant:

all the needles associated with a line of multiindented wheels are parallel to one another and thus have a common orientation; and the common orientations of the needles associated with two adjacent lines of multiindented wheels are symmetrical with respect to one another in relation to said lines.

Said fixed support of the multiindented wheels may be plane. Nevertheless, for reasons associated with braiding mesh clamping, it is advantageous that said plane support should be cylindrical. In this case, said plane support may be constituted by the internal wall of a cylindrical collar. Such a collar may have its axis disposed vertically or horizontally.

Moreover, French Patents FR-A-2 610 951 and FR-A-2 610 952 have already disclosed a plane woven armoring for composite material including weft threads distributed on a plurality of superposed levels and warp threads passing around weft threads situated at different levels. Thus, such an armoring exhibits high characteristics of delamination. However, on account of the fact that threads which make up said armoring follow, in a plane, only two directions (the warp direction and the weft direction), the composite parts which incorporate it may, for certain applications, exhibit an insufficient shear modulus, parallel to said plane.

Thus, the object of the present invention is also to construct such a plane armoring having an improved planar shear modulus.

To this end, according to the invention, the plane armoring for composite material including parallel elongate elements distributed on a plurality of superposed levels, in the manner of weft threads, is noteworthy:

in that it includes:

a first grid of threads which are parallel to one another, passing around said elongate elements situated at different levels;

a second grid of threads which are parallel to one another, passing around said elongate elements situated at different levels; and in that the general directions of the threads of said first and second grids are symmetrical with respect to one another in relation to said parallel elongate elements.

According to the present invention, to obtain such a plane armoring:

initially there is constructed a braided tubular structure including parallel longitudinal elongate elements distributed on a plurality of collars coaxial with the structure and braiding threads which form two grids of directions oblique and symmetrical in relation to the longitudinal elongate elements and interlaced with said longitudinal elongate elements, said braiding threads following paths which cause them to pass between said longitudinal elongate elements, so that said braiding threads of each one of said grids form an assembly of superposed layers in which said braiding threads are parallel from one layer to the next; then said tubular structure is split along a longitudinal cutting line parallel to said longitudinal elongate elements.

Thus, after the longitudinal cutting of said tubular structure and flattening of the latter, the result obtained is a plane armoring as mentioned hereinabove, in which, on the one hand, said first and second grids of parallel threads are constituted respectively by said grids of braiding threads and, on the other hand, said parallel elongate elements distributed on a plurality of superposed levels are formed by said longitudinal elongate elements distributed on the plurality of coaxial collars of said braided tubular structure.

Thus, such a process permits the construction, by braiding, that is to say at high speed, of the plane structure according to the invention. The latter can therefore be manufactured more rapidly than the conventional woven armorings, although it exhibits great improvements as compared with the latter.

It will be noted that, to obtain such a plane armoring, it is advantageous to make use of the braiding machine specified hereinabove, equipped with cutting means to split longitudinally the braid formed by said machine.

The figures of the accompanying drawing will give a good understanding of how the invention may be performed. In these figures, identical references designate similar elements.

FIG. 2 is an enlarged partial side view, partly cut away, of the machine of FIG. 1, illustrating the arrangement of the multiindented wheels, the spindles, the directing needles and the thread guides, according to the present invention.

Figure 4:
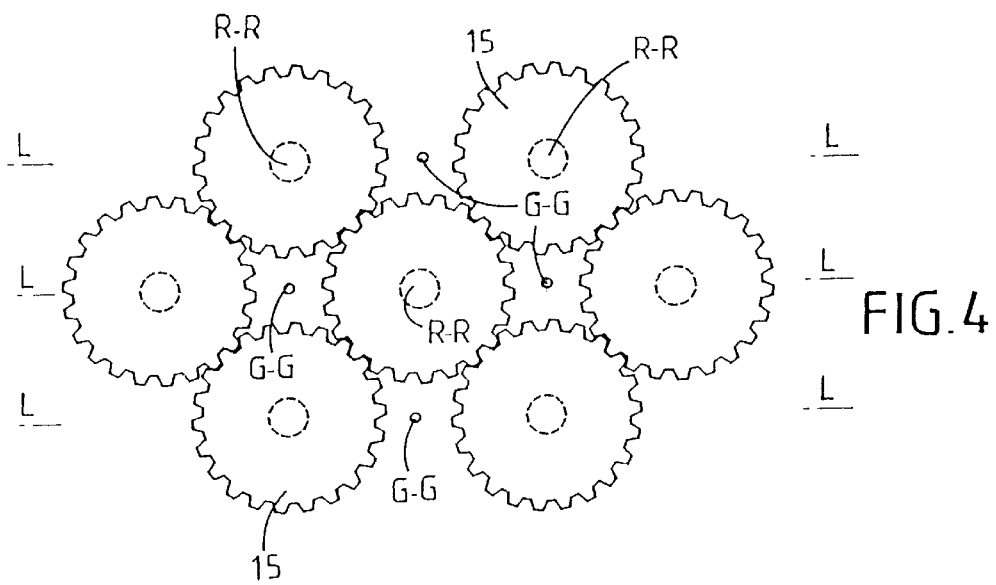

FIG. 4 diagrammatically illustrates the quincuncial arrangement of the pinions which are solid with the multiindented wheels.

Figure 5:
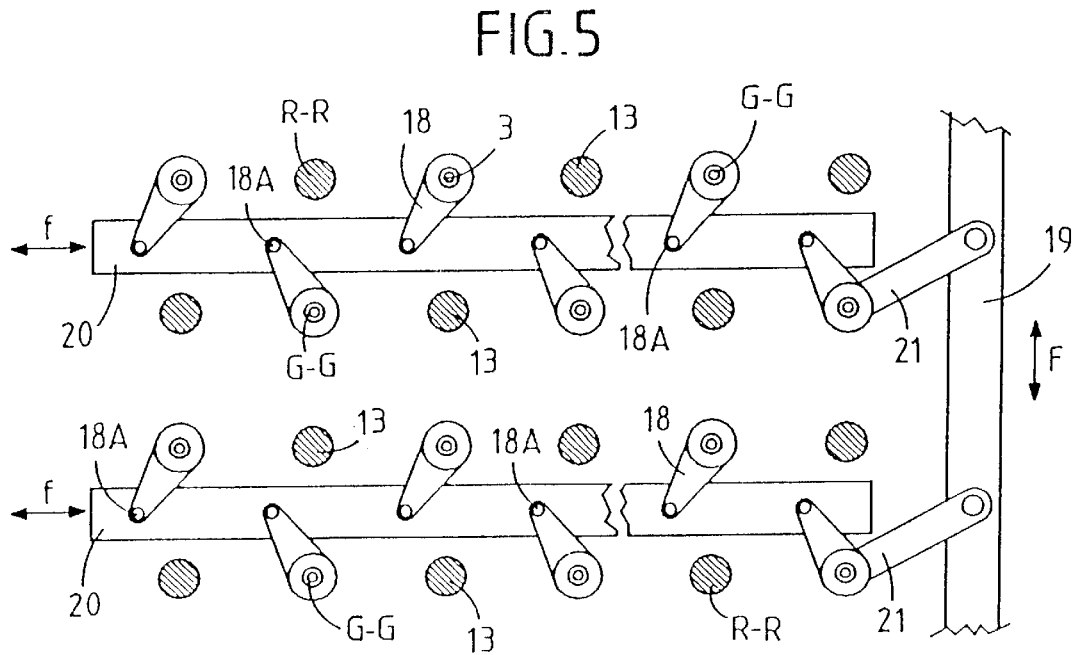

FIG. 5 diagrammatically shows the control linkage gear of the directing needles.

FIGS. 6A to 6F diagrammatically illustrate the rectilinear translational movement of the spindles orthogonally to the lines of the arrangement of the multiindented wheels.

Figure 7A:
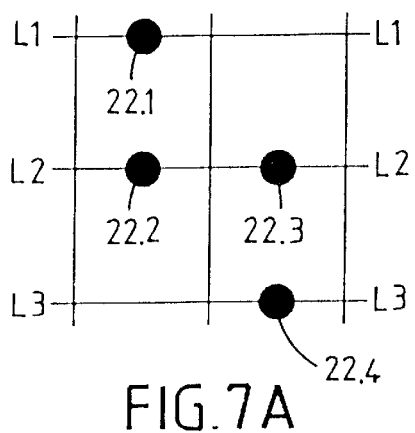
Figure 7B:
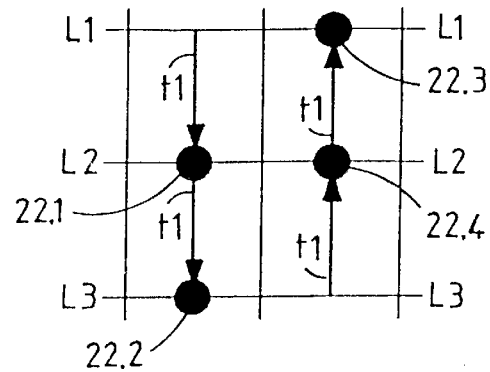

FIGS. 7A and 7B diagrammatically illustrate the result of the rectilinear translation of FIGS. 6A to 6F.

FIGS. 8A to 8F diagrammatically illustrate the rectilinear translational movement of the spindles parallel to the lines of the arrangement of the multiindented wheels.

Figure 9A:
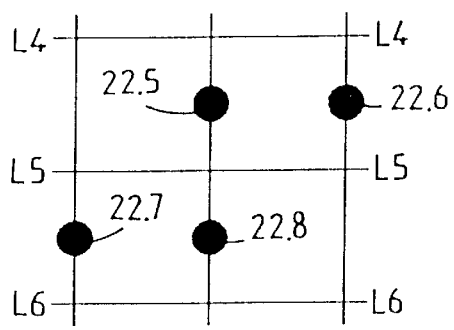
Figure 9B:
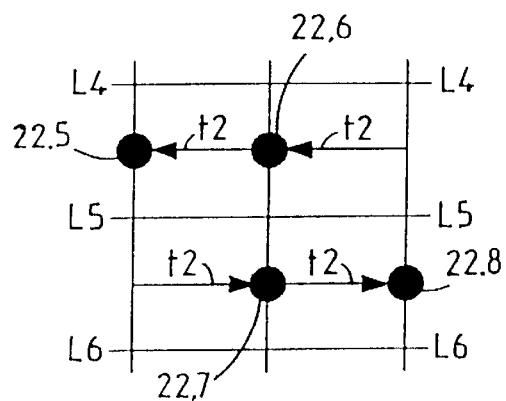

FIGS. 9A and 9B diagrammatically illustrate the result of the rectilinear translation of FIGS. 8A to 8F.

FIGS. 10A to 10E diagrammatically illustrate the circular translational movement of the spindles permitting the association of the rectilinear translations of FIGS. 6 and 7 with the rectilinear translations of FIGS. 8 and 9.

Figure 11A:
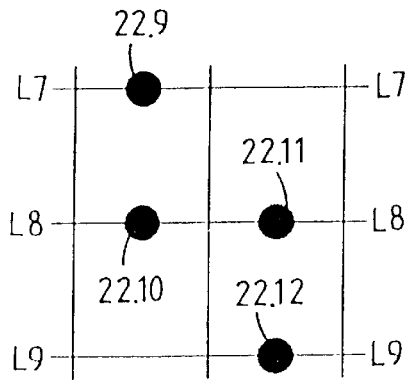
Figure 11B:
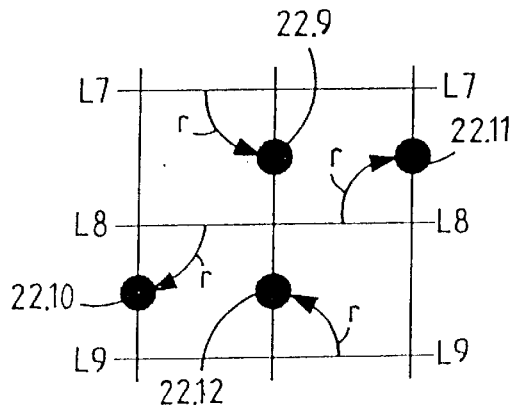

FIGS. 11A and 11B diagrammatically illustrate the result of the circular translation of FIGS. 10A to 10E.

Figure 12:
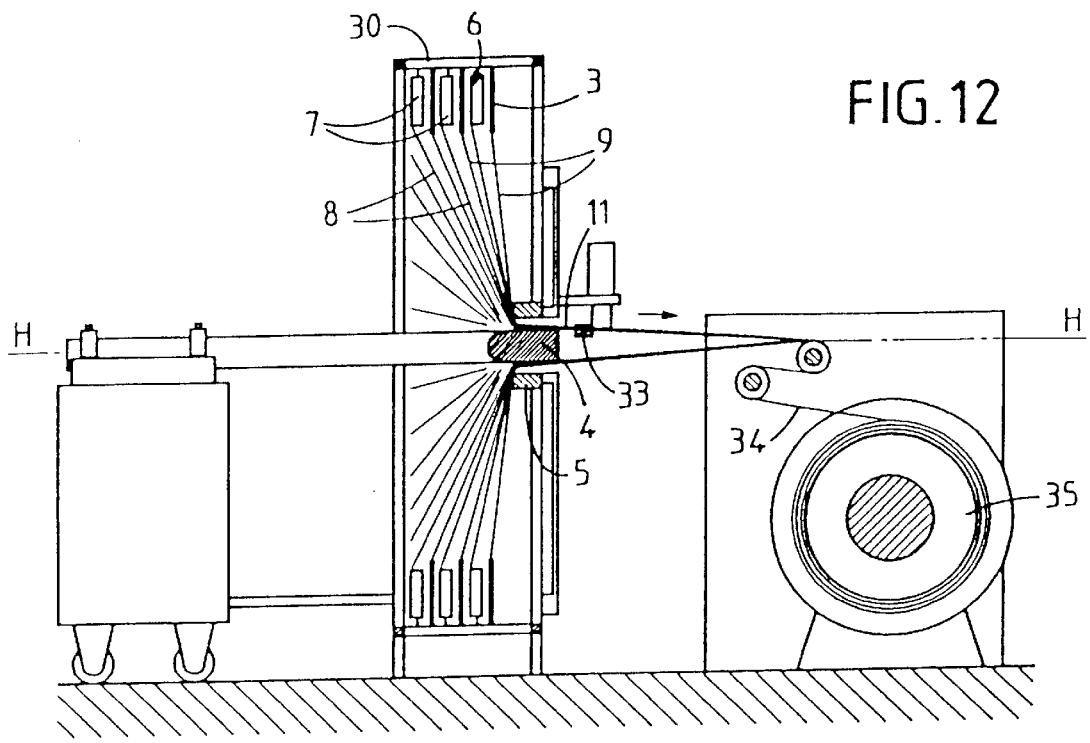
Figure 13:
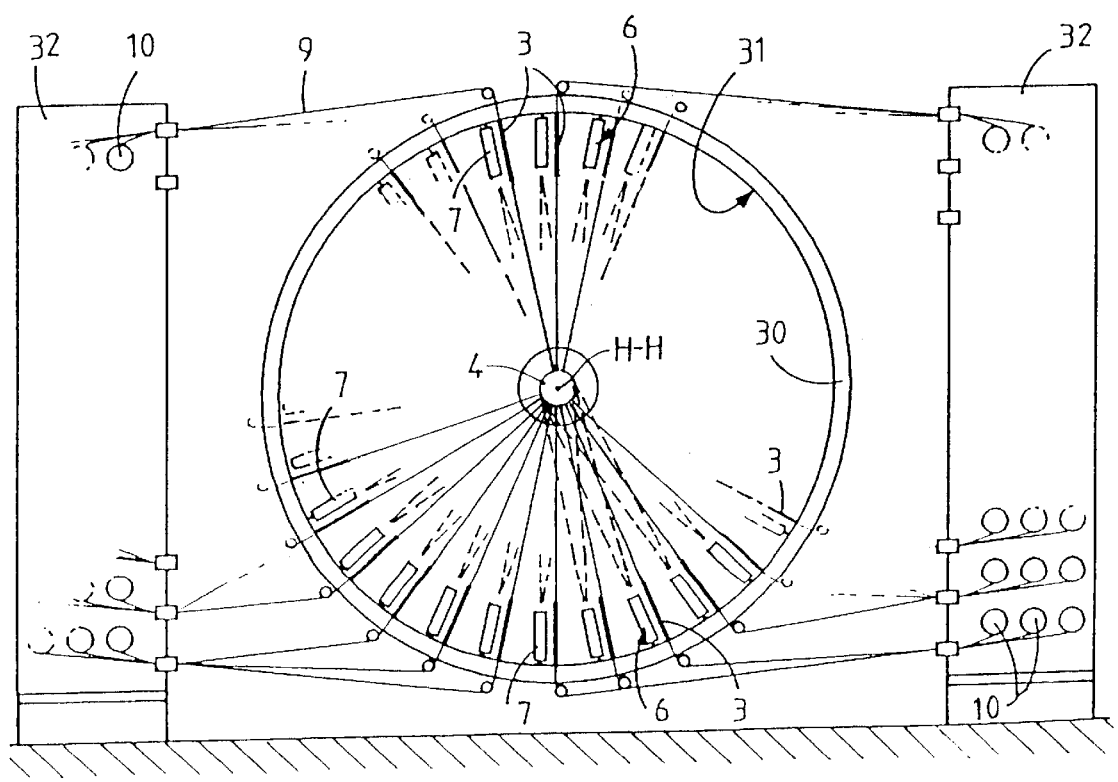

FIGS. 12 and 13 are, respectively, a side view and a diagrammatic front view of an embodiment of the braiding machine according to the present invention.

FIG. 14 is a side elevation view of a diagrammatic modified embodiment of the braiding machine of FIGS. 12 and 13.

FIGS. 15, 16 and 17 show, respectively, examples of braiding meshes according to the present invention, in the particular case of a structure incorporating two superposed levels of parallel threads.

Figure 18:
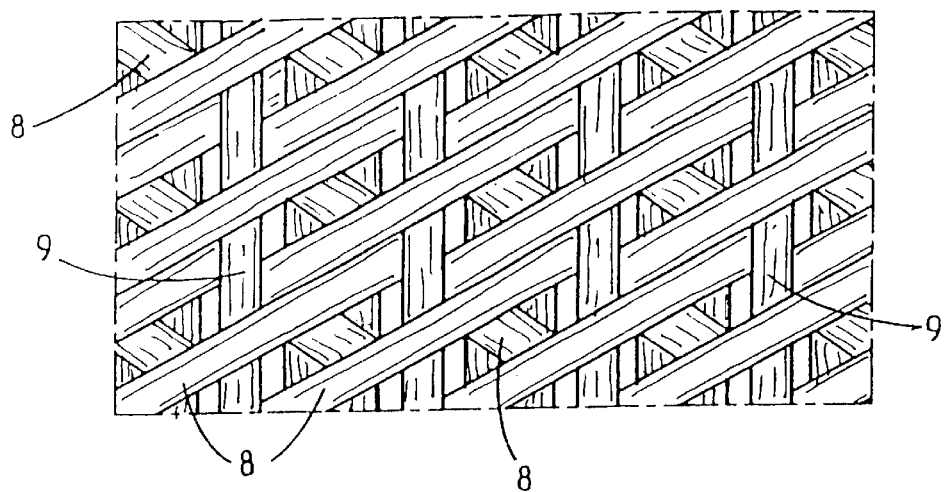
Figure 19:
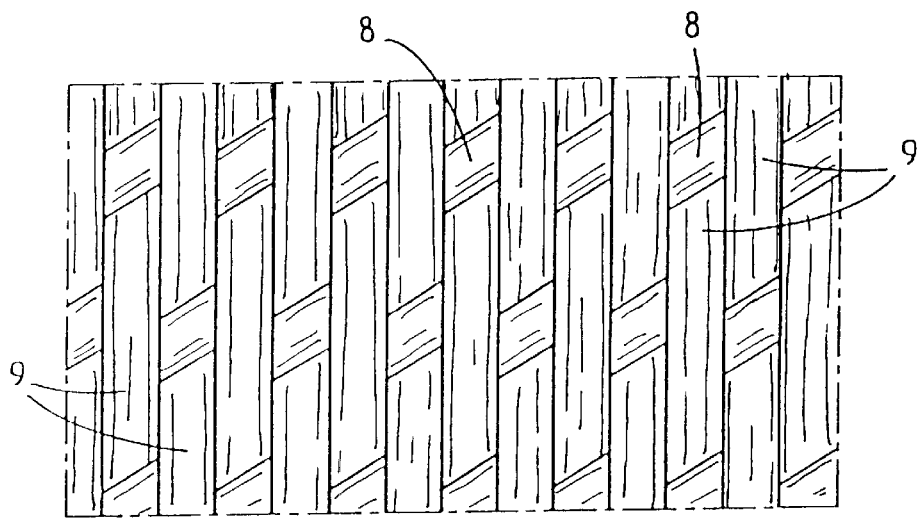
Figure 20:
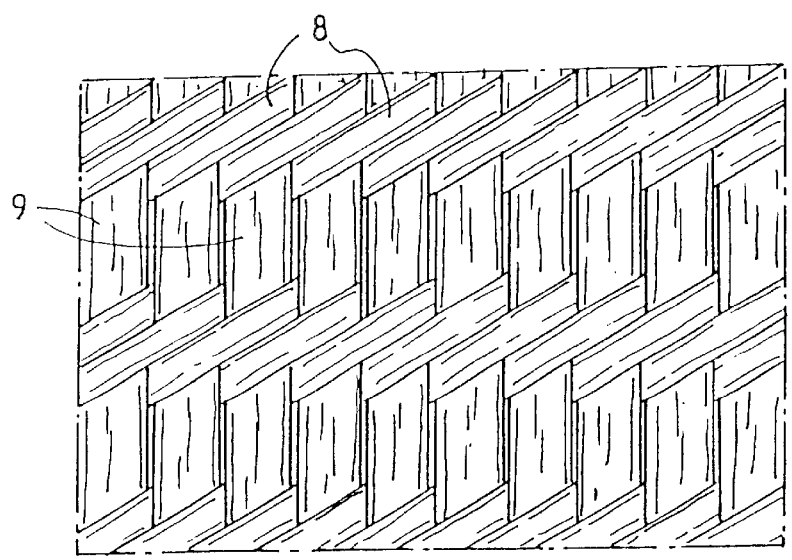

FIGS. 18, 19 and 20 illustrate, respectively, the surface appearance of braidings obtained by the meshes of FIGS. 15, 16 and 17.

Figure 21:
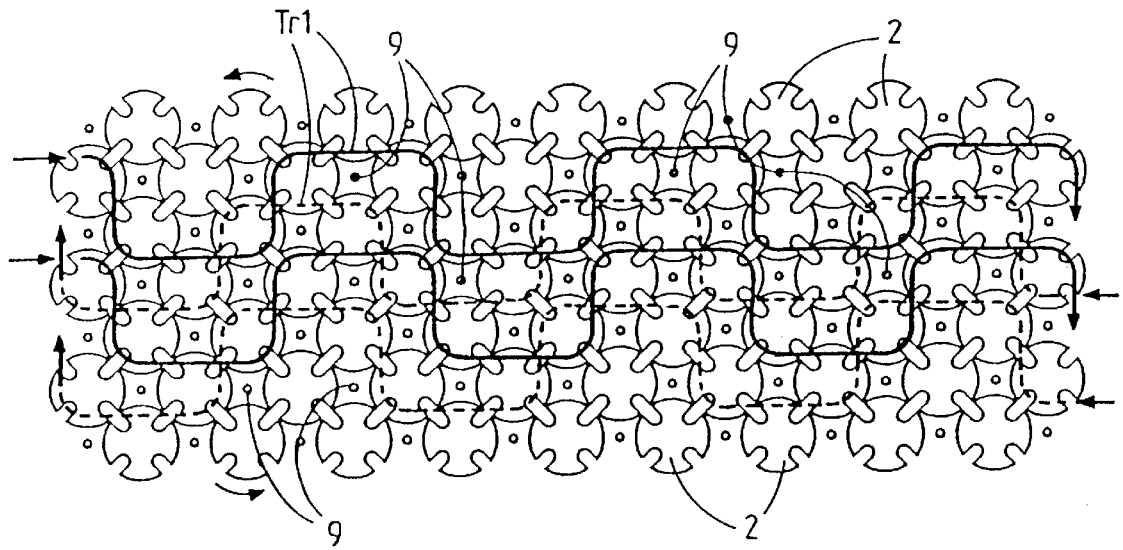
Figure 22:
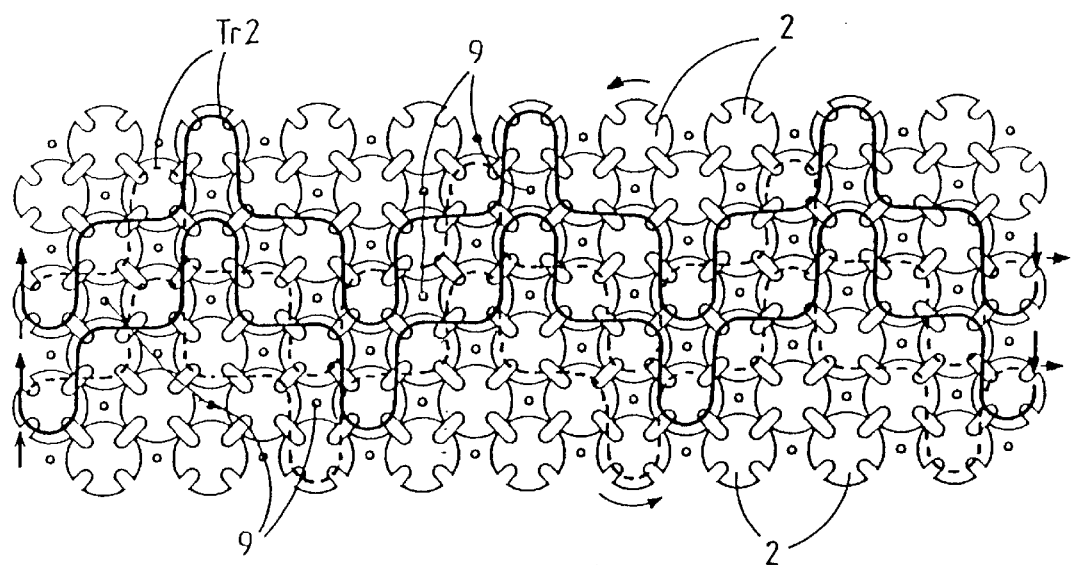

FIGS. 21 and 22 illustrate, diagrammatically, two examples of displacement paths of the spindles to obtain the mesh of FIGS. 15 and 18.

Figure 23:
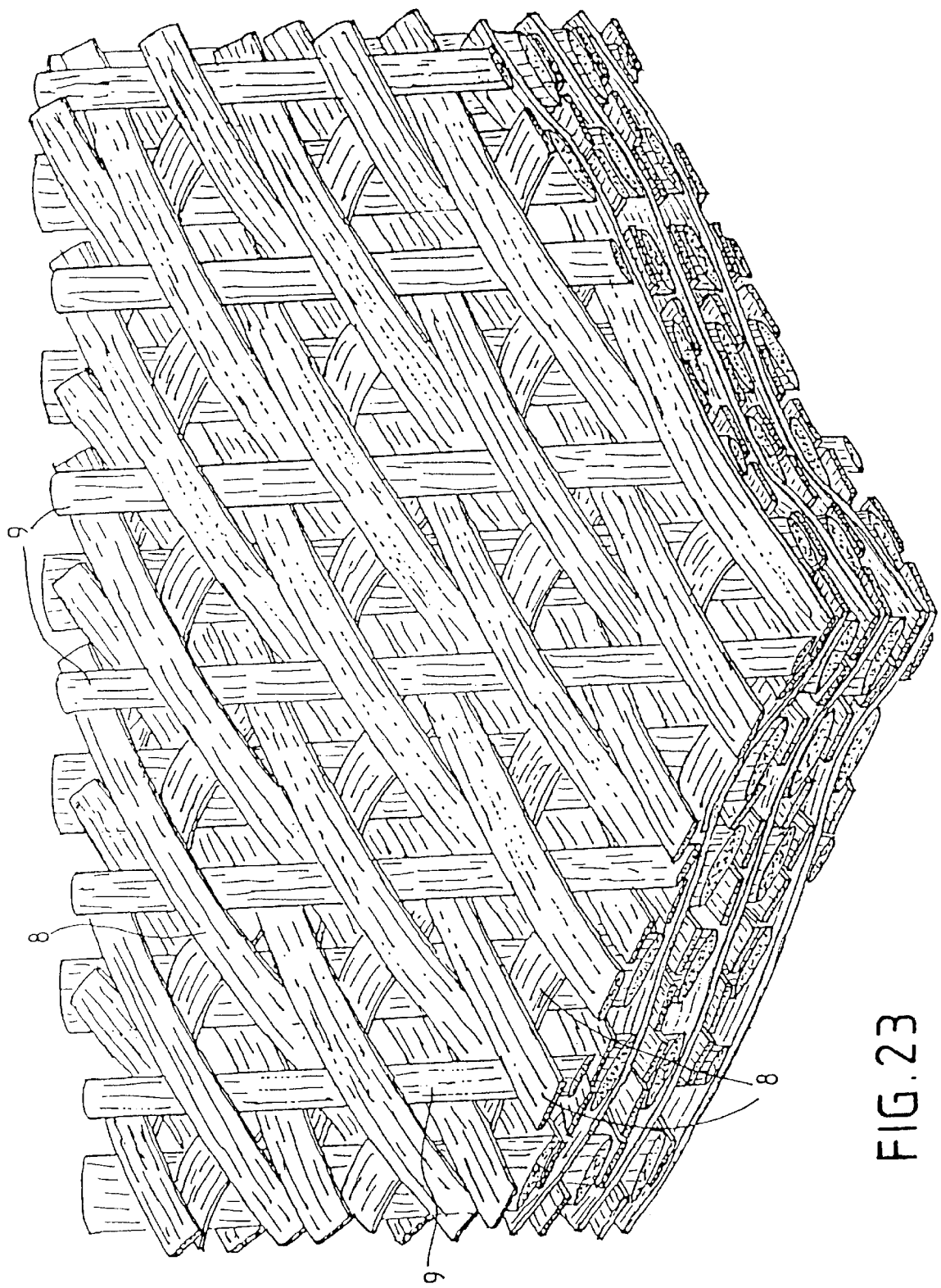

FIG. 23 illustrates, in diagrammatic perspective, a braiding incorporating seven levels of longitudinal threads exhibiting the mesh of FIGS. 15 and 18.

Figure 24:
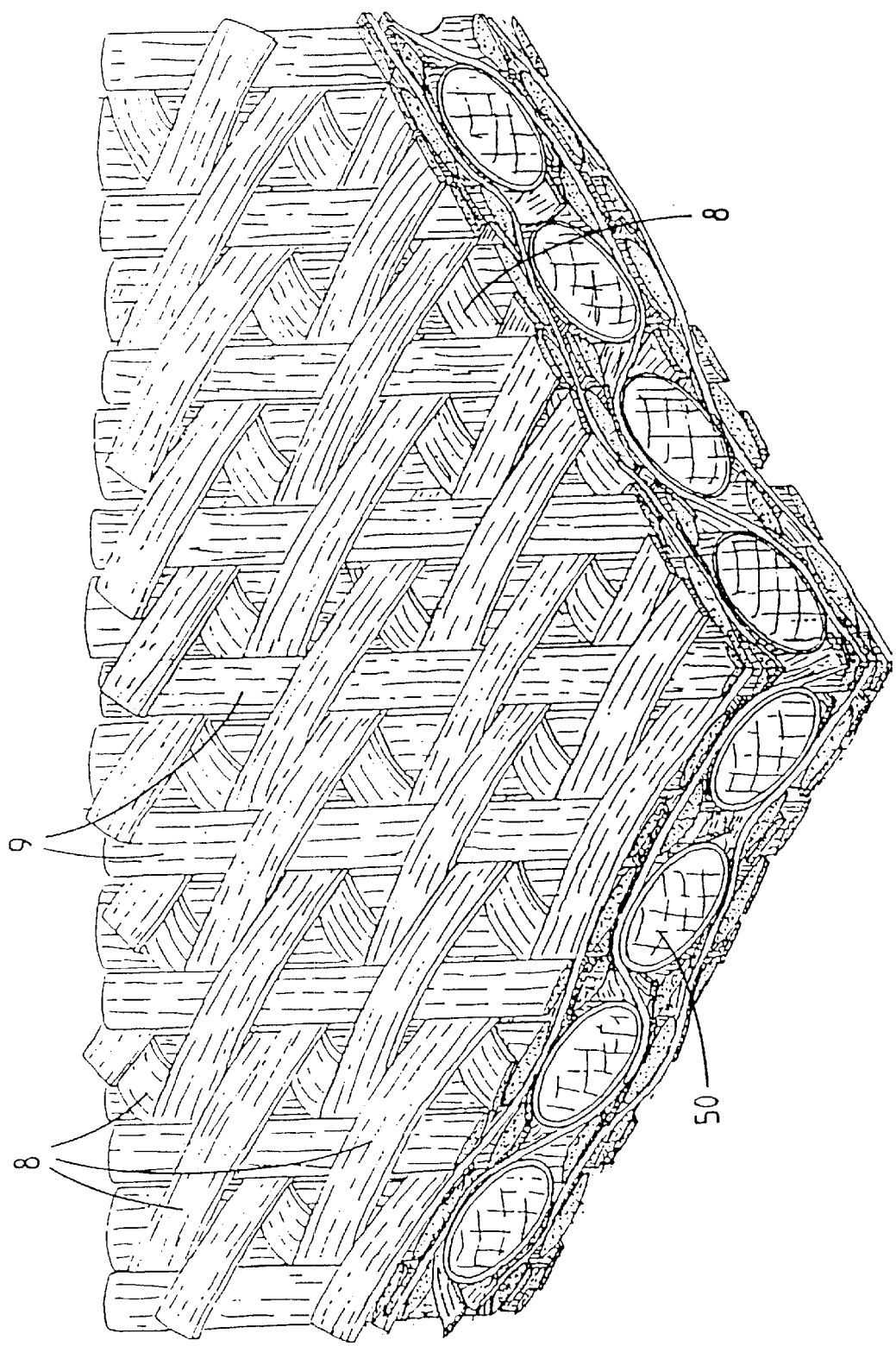

FIG. 24 illustrates, in diagrammatic perspective, a braiding exhibiting the mesh of FIGS. 15 and 18 and in which some parallel threads are replaced by elongate tubular elements.

Figure 25:
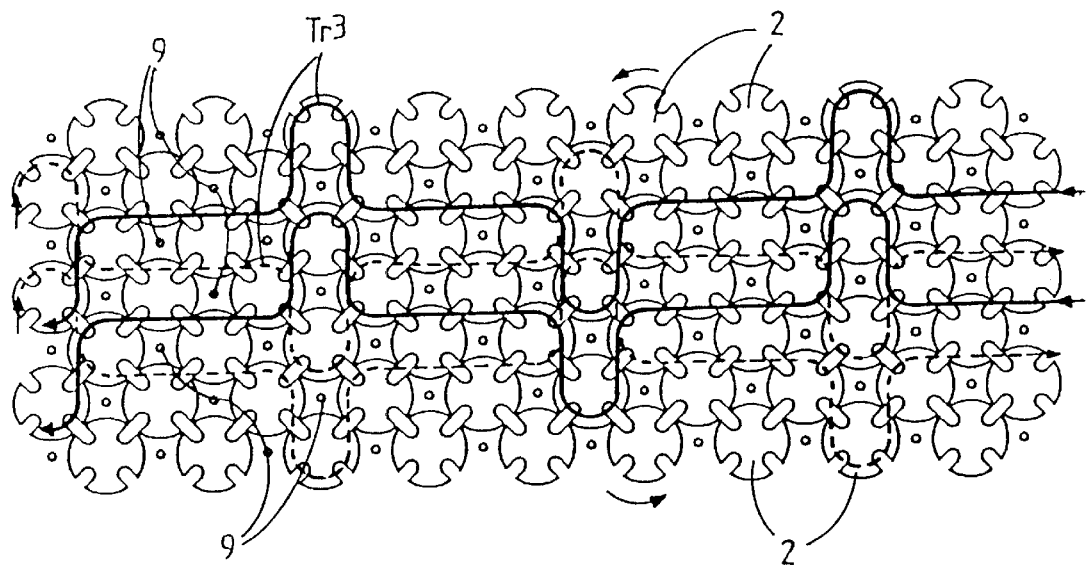
Figure 26:
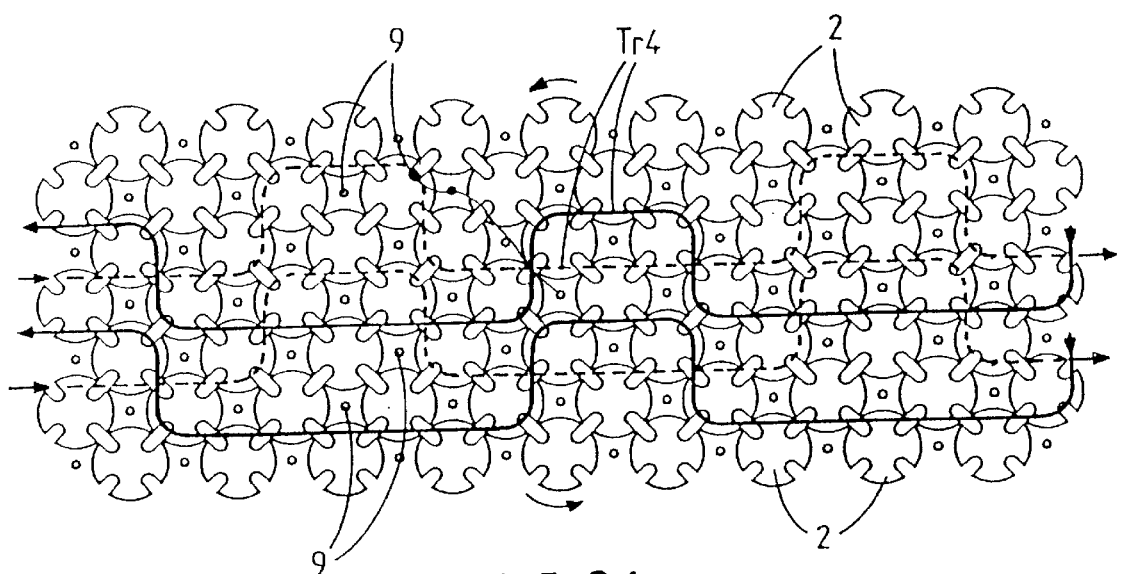

FIGS. 25 and 26 illustrate, diagrammatically, two examples of displacement paths of the spindles to obtain the mesh of FIGS. 16 and 19.

Figure 27:
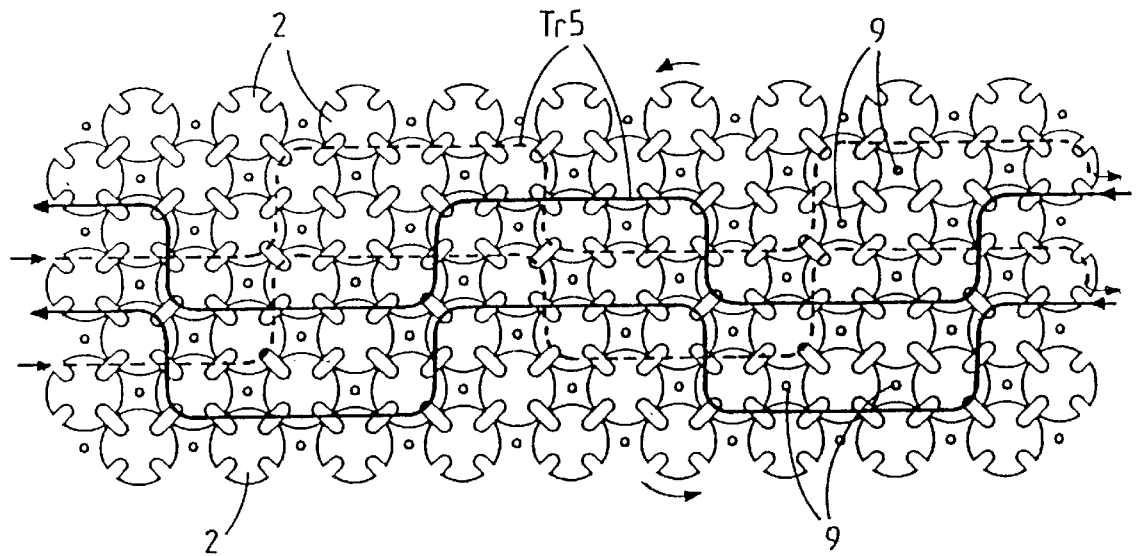

FIG. 27 illustrates, diagrammatically, an example of displacement paths of the spindles to obtain the mesh of FIGS. 17 and 20.

Figure 28:
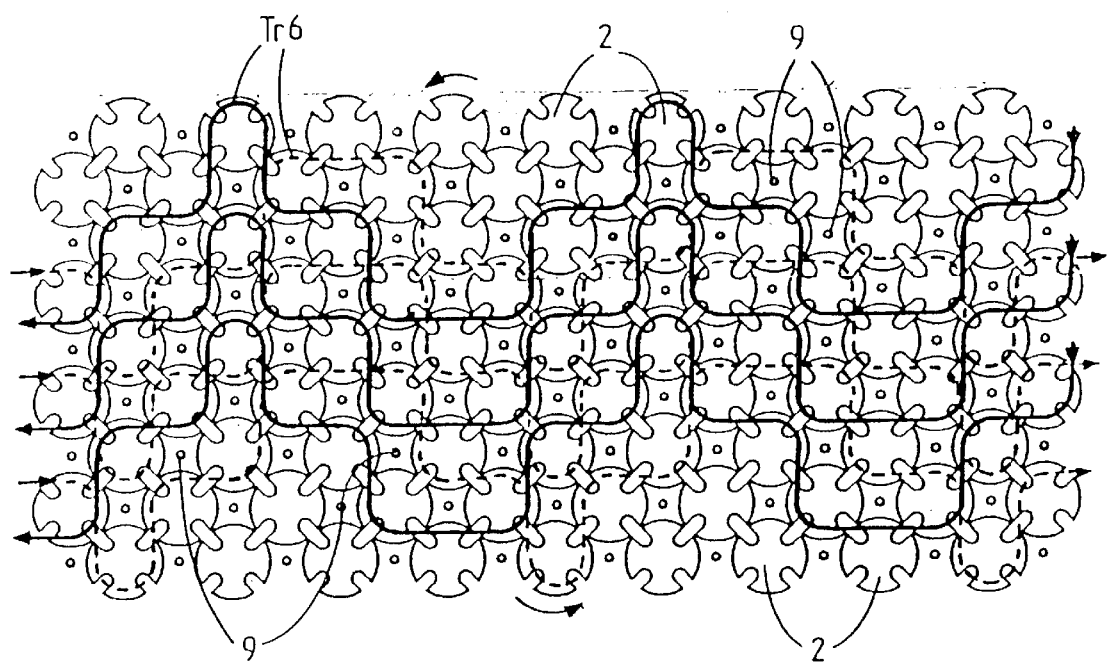

FIG. 28 illustrates, diagrammatically, yet another example of displacement paths of the spindles for a braiding variant incorporating seven levels.

FIG. 29 illustrates, in diagrammatic perspective, the seven-level braiding obtained by the displacement of the spindles in accordance with FIG. 28.

Figure 1:
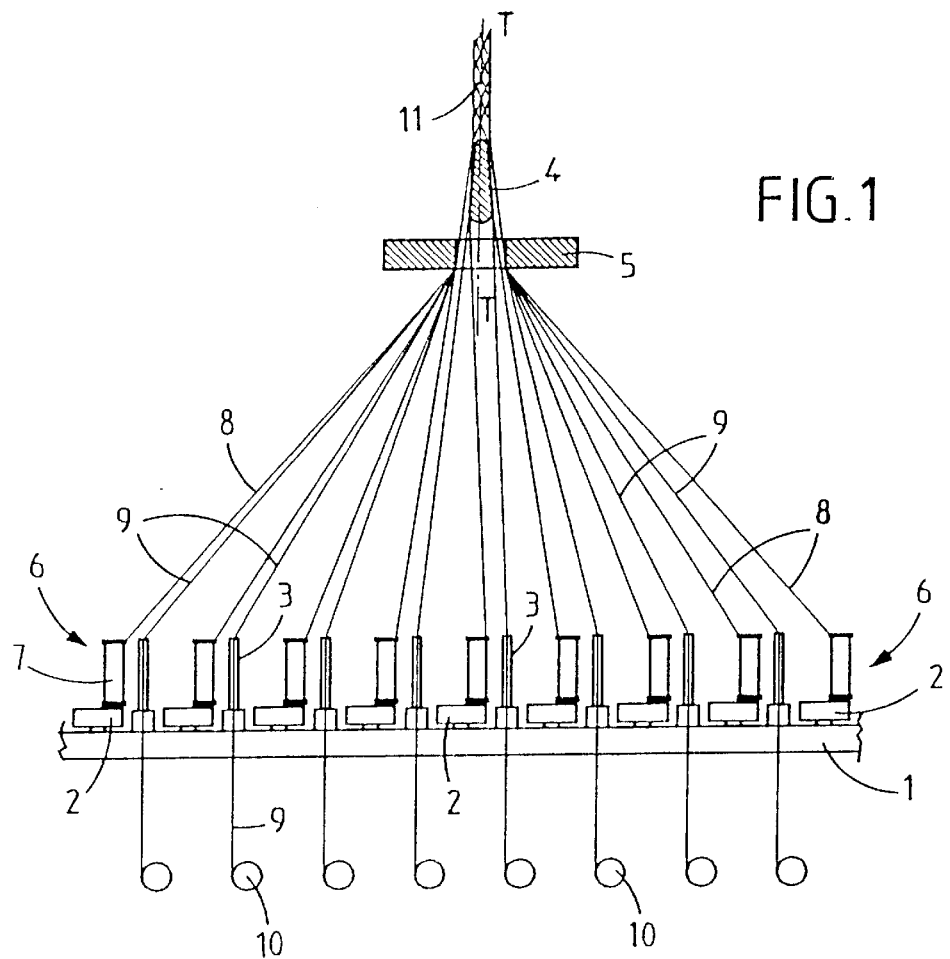
FIG. 1 is a diagrammatic side view of a part of a braiding machine according to the present invention.

The braiding machine which is diagrammatically and partially represented in FIG. 1 includes a support 1 on which there are journaled a set of identical multiindented wheels 2 and on which there are mounted traversing guidance tubes 3. This machine further includes a braid formation mandrel 4 of longitudinal axis T—T and a mesh formation ring 5, which is coaxial with said mandrel.

As is customary, the multiindented wheels 2, which are driven in rotation by means not shown, cause the circulation of spindles 6 carrying spools 7 of braiding threads 8. These threads 8 are wound off from the spools 7 and pass through the ring 5 and are applied onto the mandrel 4. Such spindles 6 are very well known in the art of braiding and, in FIGS. 1 and 2, they are represented only very diagrammatically.

Moreover, threads 9 which are wound off from spools 10 pass through the guidance tubes 3 and the ring 5 and are applied onto said mandrel 4, being disposed parallel to one another and being distributed on a plurality of collars coaxial with the axis T—T.

The multiindented wheels 2, while causing the circulation of the spindles 6 and thus the spools 7 about the axis T—T, interlace the braiding threads 8 with the parallel threads 9, forming, in a known manner, two grids of directions oblique in relation to said parallel threads 9, said braiding threads 8 following paths which cause them to pass between said parallel threads 9.

The result of this, on the mandrel 4, is the progressive formation of a braided tubular structure or braid 11, of axis T—T.

Figure 3:
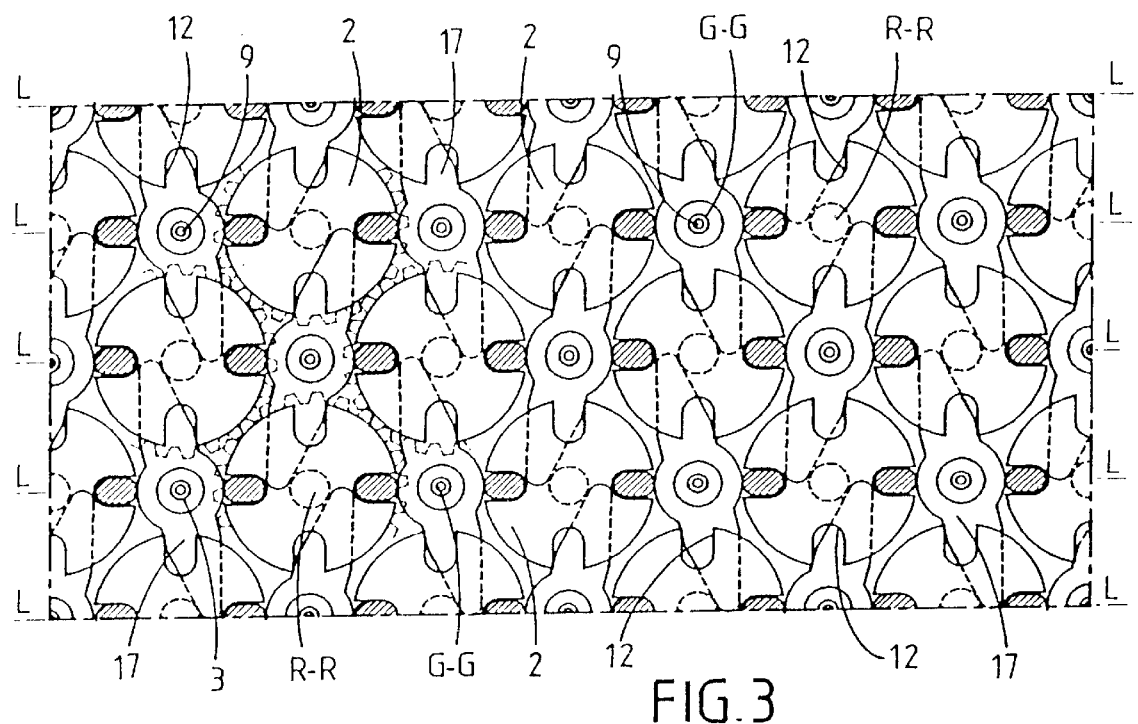
FIG. 3 is a partial plan view of the quincuncial arrangement of the multiindented wheels, the spindle roots, the directing needles and the thread guides, according to line III—III of FIG. 2.

FIGS. 2, 3 and 4 show in greater detail that:

each multiindented wheel 2 is dual and is constituted by two parallel disks 2A and 2B, which are respectively provided with four radial notches 12A or 12B regularly distributed at their periphery, each notch 12A of the disk 2A being superposed upon a notch 12B of the disk 2B to form an indentation 12 for a wheel 2. Each wheel 2 thus includes four indentations 12 distributed at 90° at its periphery;

each multiindented wheel 2 is solid with a shaft 13, of axis R—R, which is journaled in the support 1, by virtue of roller bearings 14; and a pinion 15 is keyed on each shaft 13.

In addition, according to the invention, it can be seen therein that:

the multiindented wheels 2 are disposed in parallel and equidistant lines L—L;

the multiindented wheels 2 belonging to a line L—L are spaced from one another, so that the two pinions 15 associated respectively with two consecutive multiindented wheels belonging to one and the same line cannot be in engagement with one another;

a multiindented wheel 2 belonging to one line L—L is disposed between two multiindented wheels 2 belonging to an adjacent line L—L and the three pinions 15 associated respectively with these three multiindented wheels mesh with one another. It will be noted that, by virtue of this particular feature and the preceding one, two consecutive multiindented wheels 2 belonging to one and the same line turn in the same direction;

the guidance tubes 3 are disposed in the spaces between the multiindented wheels 2, in such a way that their axes G—G are situated on said lines L—L, at equal distances from the axes R—R of the consecutive multiindented wheels 2.

Thus, the multiindented multiindented wheels 2 and the guidance tubes 3 are respectively disposed in quincunces, said quincunces being overlapped.

Moreover, as can be seen in FIG. 2, each guidance tube 3 is mounted on the support 1 via a foot 16, which is fixed in said support by a tenon 16A. On each foot 16 there is mounted to rotate about the corresponding axis G—G a jacket 16B which carries, at its upper part, a directing finger 17 in the form of a rhomboidal needle (see also FIG. 3) and, at its lower part, a control tab 18 (see also FIG. 5).

For the control of the orientation of said needles 17, the machine includes a linkage gear including a common sliding bar 19 and a plurality of sliding bars 20, which are parallel to one another but orthogonal to the common bar 19. Each one of the bars 20 is articulated, at one of its ends, to the common bar 19 via a rocker bar 21, so that said bars 20 are driven in translation parallel to their longitudinal axis (arrows f) when said common bar 19 is displaced parallel to its longitudinal axis (arrow F).

Each bar 20 is intended for the control of the needles 17 of two consecutive lines L—L, so that the control tabs 18, associated with these two lines of needles, are articulated by their free ends, at 18A, to said bar 20.

Furthermore, the arrangement of said control tabs 18 on the bars 20 is such that:

all the needles 17 of a line are parallel to each other and remain parallel to each other when they turn about their respective axes G—G, under the action of the corresponding sliding bar 20, which is itself driven to slide by the common bar 19;

the needles 17 belonging to two adjacent lines L—L are symmetrical with respect to one another in relation to the lines and turn while remaining symmetrical, when the common blade 19 slides.

Thus, the common orientation of the needles 17 of a line L—L is symmetrical with respect to the common orientation of the needles 17 of an adjacent line L—L, and all the needles 17 of one line L—L in two are parallel to one another.

The total amplitude of rotation of each needle 17, under the action of the sliding of the common blade 19, may be in the order of 60°.

In customary fashion, each spindle 6 is provided with a foot 22 which is capable of being grasped by an indentation 12 of a wheel 2 to permit the displacement of said spindles in relation to said set of multiindented wheels, under the control of the needles 17, as is described hereinbelow with reference to FIGS. 6 to 11.

FIGS. 6A to 6F and 7A, 7B illustrate a first elementary path for the displacement of the spindles 6. FIGS. 6A to 6F show a group of four multiindented wheels 2.1 to 2.4 and five needles 17.1 to 17.5 disposed in such a manner that:

the multiindented wheel 2.1 and the needles 17.1 and 17.2 are disposed on a line L1—L1, said needles being adjacent to said wheel and placed on either side of the latter;

the multiindented wheels 2.2. and 2.3 and the needle 17.3 are disposed on a line L2—L2 adjacent to the line L1—L1, said wheels being adjacent to said needle and placed on either side of the latter;

the multiindented wheel 2.4 and the needles 17.4 and 17.5 are disposed on a line L3—L3 adjacent to the line L2—L2, said needles being adjacent to said wheel and placed on either side of the latter; and the pinions 15 (not shown) of the multiindented wheels 2.1 to 2.4 cooperate with one another, as is illustrated in FIG. 4.

Furthermore, in FIG. 6A, which illustrates an initial condition, it has been assumed that:

the needles 17.1, 17.2, 17.4 and 17.5 exhibit an orientation, regulated by the linkage gear 19, 20, such that they make an angle A close to 75° in relation to their respective line L1—L1 or L3—L3;

the needle 17.3 exhibits an orientation, regulated by the linkage gear 19, 20, such that it makes an angle B close to 105° in relation to the line L2—L2;

each one of the multiindented wheels 2.1 to 2.4 exhibits two aligned indentations on the line L1—L1, L2—L2 or L3—L3, respectively;

spindle feet 22.1, 22.2, 22.3 and 22.4 are situated respectively on the lines L1—L1, L2—L2 and L3—L3, the foot 22.1 (in engagement with the multiindented wheel 2.1) being opposite the needle 17.1, while the feet 22.2 and 22.3 (in engagement with the multiindented wheels 2.2 and 2.3 respectively) are situated to the side of the needle 17.3 and the foot 22.4 (in engagement with the multiindented wheel 2.4) is opposite the needle 17.5; and the multiindented wheel 2.1 turns in a counterclockwise direction, so that the same applies to the multiindented wheel 2.4 and the two multiindented wheels 2.2 and 2.3 turn in a clockwise direction.

Furthermore, in FIGS. 6A to 6F, it is assumed that the needles 17.1 to 17.5 maintain a fixed orientation, as described hereinabove.

In these circumstances, as soon as the multiindented wheels 2.1 to 2.4 turn, they bring the feet 22.1 and 22.4 into contact with the needle 17.3 and the feet 22.2 and 22.3, respectively, into contact with the needles 17.4 and 17.2 (see FIG. 6B). As the rotation of said multiindented wheels continues, indentations of different multiindented wheels come opposite said feet 22.1 to 22.4 and the needles 17.2, 17.3 and 17.4 push said feet 22.1 to 22.4 so as to cause them to penetrate into the indentation of another multiindented wheel and, accordingly, to cause them to change multiindented wheel.

On examining the successive steps illustrated by FIGS. 6C, 6D, 6E and 6F, it is possible to establish that:

the foot 22.1 passes from the multiindented wheel 2.1 to the multiindented wheel 2.2, the foot 22.2 passes from the multiindented wheel 2.2 to the multiindented wheel 2.4, the foot 22.3 passes from the multiindented wheel 2.3 to the multiindented wheel 2.1, the foot 22.4 passes from the multiindented wheel 2.4 to the multiindented wheel 2.3.

When all the multiindented wheels have turned through a quarter revolution (FIG. 6F), all the feet 22.1 to 22.4 have executed an elementary translational path t1, orthogonal to said lines L1—L1, L2—L2 and L3—L3 and of amplitude equal to the distance between said lines, as is clearly illustrated in FIGS. 7A and 7B, which respectively illustrate the initial positions (FIG. 7A) and the final positions (FIG. 7B) corresponding to FIGS. 6A and 6F respectively.

Through this elementary path t1, the feet 22.1 and 22.2 have moved further away from the line L1—L1 in the direction of the line L3—L3, while the feet 22.3 and 22.4 have moved away from the line L3—L3 in the direction of the line L1—L1.

FIGS. 8A to 8F and 9A, 9B illustrate a second elementary path for the displacement of the spindles 6. FIGS. 8A to 8F show a group of four multiindented wheels 2.5 to 2.8 and five needles 17.6 to 17.10, respectively disposed on lines L4—L4, L5—L5 and L6—L6, in a similar manner to the arrangement of the multiindented wheels 2.1 to 2.4 and of the needles 17.1 to 17.5 on the lines L1—L1, L2—L2 and L3—L3, as shown in FIGS. 6A to 6F.

Figure 8A:
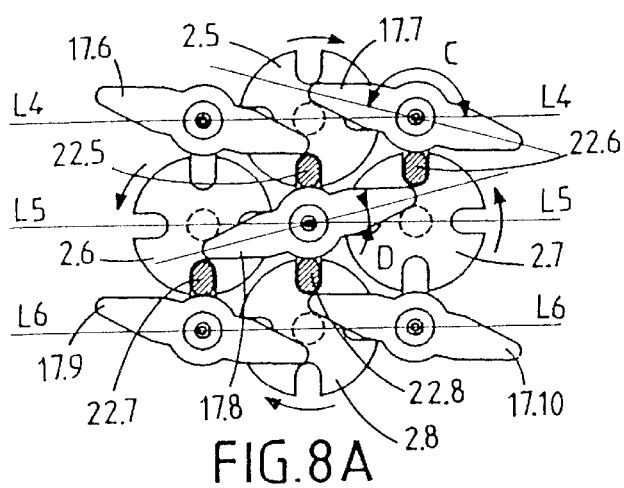

In FIG. 8A, which illustrates an initial condition:

the needles 17.6, 17.7, 17.9 and 17.10 have an orientation, imposed by the linkage gear 19, 20, such that they make an angle C close to 165° in relation to their respective line L4—L4 or L6—L6;

the needle 17.8 has an orientation, such that it makes an angle D close to 15° in relation to the line L5—L5;

each one of the multiindented wheels 2.5 to 2.8 exhibits two indentations aligned perpendicularly to said lines L4—L4, L5—L5 or L6—L6;

spindle feet 22.5 to 22.8 are situated respectively in such indentations, in such a manner that:

the foot 22.5, in engagement with the multiindented wheel 2.5, is situated between the needles 17.6 and 17.8;

the foot 22.6, in engagement with the multiindented wheel 2.7, is situated between the needles 17.7 and 17.8;

the foot 22.7, in engagement with the multiindented wheel 2.6, is situated between the needles 17.8 and 17.9;

the foot 22.8, in engagement with the multiindented wheel 2.8, is situated between the needles 17.8 and 17.10.

Furthermore, in FIGS. 8A to 8F, the needles 17.6 to 17.10 maintain a fixed orientation, corresponding respectively to the angles C or D, and the multiindented wheel 2.5 turns in a clockwise direction, so that the same applies to the multiindented wheel 2.8, and the multiindented wheels 2.6 and 2.7 turn in a counterclockwise direction.

Figure 8B:
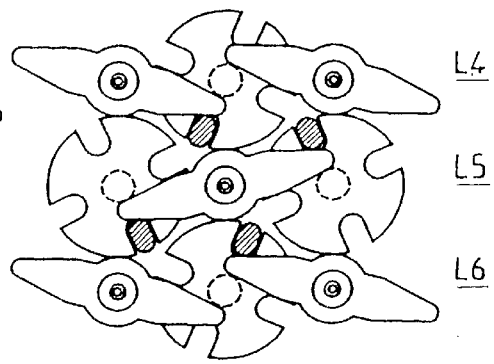
Figure 8C:
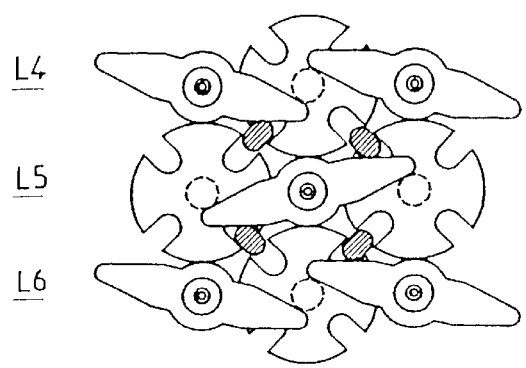
Figure 8D:
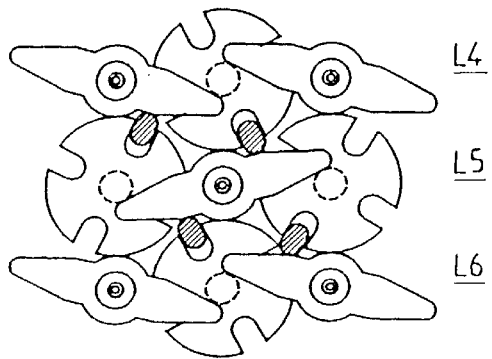
Figure 8E:
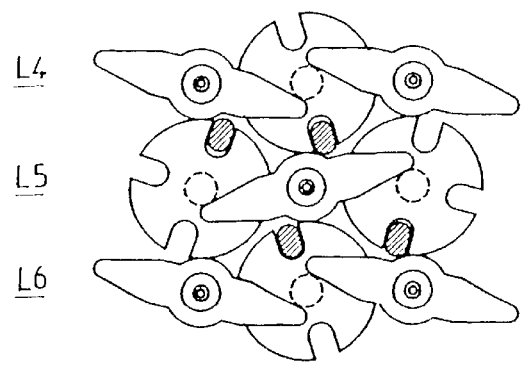

In these circumstances, as soon as the multiindented wheels 2.5 to 2.8 turn, they bring the foot 22.5 into abutment against the needle 17.6, the foot 22.8 into abutment against the needle 17.10 and the feet 22.6 and 22.7 into abutment against the needle 17.8 (see FIG. 8B). As the rotation of the multiindented wheels continues, indentations of different multiindented wheels come opposite said feet 22.5 to 22.8 and the needles 17.6, 17.8 and 17.10 push said feet 22.5 to 22.8 so as to cause them to penetrate into the indentation of another multiindented wheel and, accordingly, to cause them to change multiindented wheel.

On examining the successive steps illustrated by FIGS. 8C to 8F, it can be established that:

the foot 22.5 passes from the multiindented wheel 2.5 to the multiindented wheel 2.6, the foot 22.6 passes from the multiindented wheel 2.7 to the multiindented wheel 2.5, the foot 22.7 passes from the multiindented wheel 2.6 to the multiindented wheel 2.8, the foot 22.8 passes from the multiindented wheel 2.8 to the multiindented wheel 2.7.

Figure 8F:
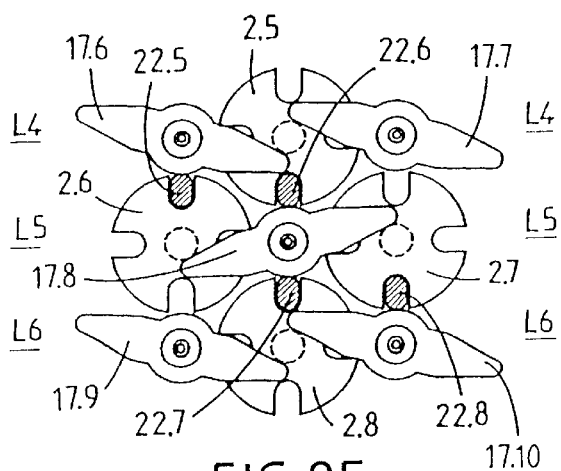

Thus, when all the multiindented wheels 2.5 to 2.8 have turned through a quarter revolution (FIG. 8F), all the feet 22.5 to 22.8 have executed an elementary translational path t2, parallel to said lines L4—L4, L5—L5 and L6—L6 and of amplitude equal to the distance between said lines, as is clearly illustrated in FIGS. 9A and 9B, which show, respectively, the initial positions (FIG. 9A) at the final positions (FIG. 9B) corresponding to FIGS. 8A and 8F respectively.

Through this elementary path t2, the feet 22.5 and 22.6 were displaced towards the left in the figures, while the feet 22.7 and 22.8 were displaced towards the right in the figures.

FIGS. 10A to 10E and 11A, 11B illustrate a third elementary path for the displacement of the spindles 6. FIGS. 10A to 10E show a group of four multiindented wheels 2.9 to 2.12 and five needles 17.11 to 17.15, respectively disposed on lines L7—L7, L8—L8 and L9—L9, in a similar manner to the arrangement of the multiindented wheels 2.1 to 2.4 and of the needles 17.1 to 17.5 on the lines L1—L1, L2—L2 and L3—L3, as represented in FIGS. 6A to 6F.

Figure 10A:
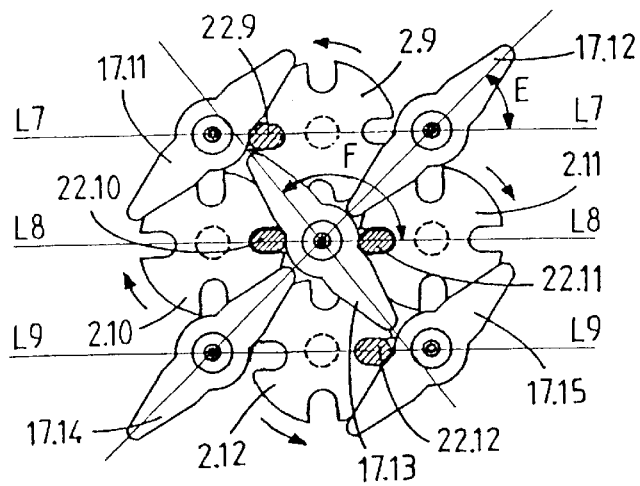
Figure 10B:
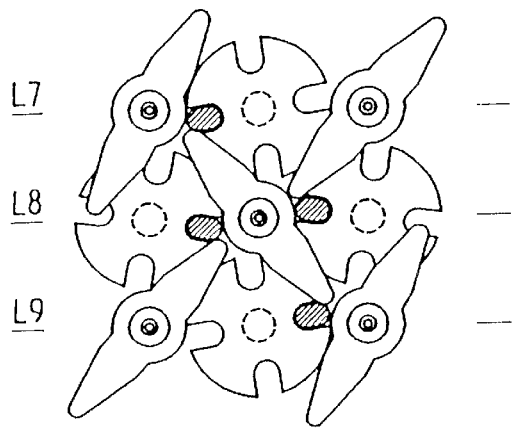
Figure 10C:
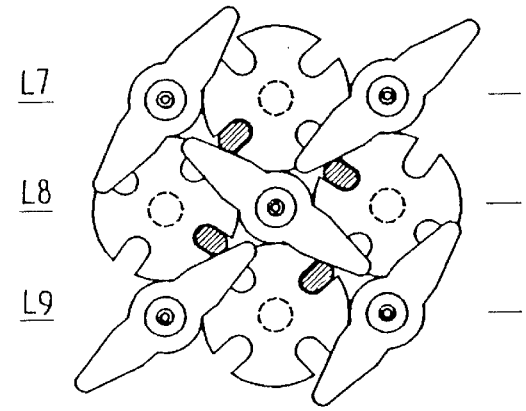
Figure 10D:
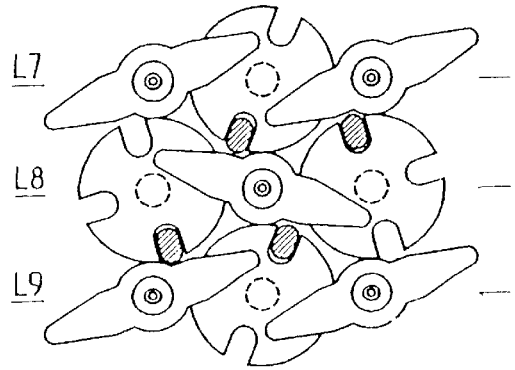

In FIG. 10A, which illustrates an initial condition:

the needles 17.11, 17.12, 17.14 and 17.15 have an orientation, imposed by the linkage gear 19, 20, such that they make an angle E close to 45° in relation to their respective line L7—L7 or L9—L9;

the needle 17.13 has an orientation, such that it makes an angle F close to 135° in relation to the line L8—L8;

each one of the multiindented wheels 2.9 to 2.12 exhibits two indentations aligned with the lines L7—L7, L8—L8 or L9—L9;

spindle feet 22.9 to 22.12 are situated respectively in such indentations, in such a manner that:

the foot 22.9, in engagement with the multiindented wheel 2.9, is situated between the needles 17.11 and 17.13;

the foot 22.10, in engagement with the multiindented wheel 2.10, is situated between the needles 17.13 and 17.14;

the foot 22.11, in engagement with the multiindented wheel 2.11, is situated between the needles 17.12 and 17.13;

the foot 22.12, in engagement with the multiindented wheel 2.12, is situated between the needles 17.13 and 17.15.

Figure 10E:
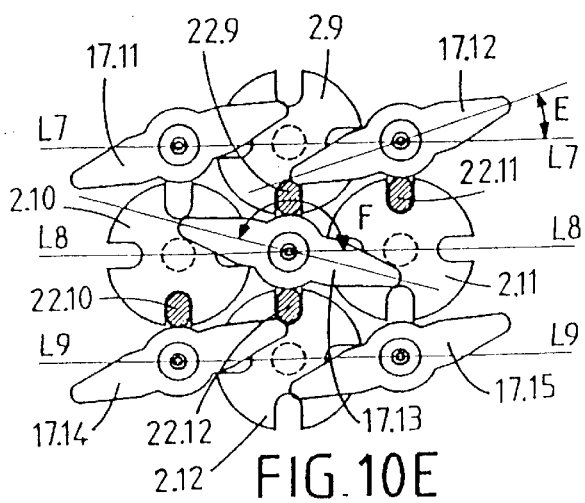

In FIGS. 10A to 10F, the multiindented wheel 2.9 turns in a counterclockwise direction, so that the same applies to the multiindented wheel 2.12 and the multiindented wheels 2.10 and 2.11 turn in a clockwise direction. Furthermore, in the execution of said third elementary path, the needles are controlled in orientation by the linkage gear 19, 20, so that the angles E and F change respectively from initial values approximately equal to 45° and 135° (FIG. 10A) to final values approximately equal to 15° and 165° (FIG. 10E).

In these circumstances, as soon as the multiindented wheels 2.9 and 2.12 and the needles 17.11 to 17.15 start to turn, the feet 22.9 and 22.12 are supported against the needle 17.13, while the feet 22.10 and 22.11 come respectively into abutment against the needles 17.14 and 17.12. Each one of said feet 22.9 to 22.12 is then obliged to remain within the indentation in which it was initially accommodated, without any possibility of changing multiindented wheels.

Thus, when all the multiindented wheels 2.9 to 2.12 have turned through a quarter revolution (FIG. 10E), all the feet 22.9 to 22.12 have likewise turned through a quarter revolution, about the axis of their respective multiindented wheels, so that each one of them has executed an elementary rotational path r through a quarter turn, either in a clockwise direction (22.9 and 22.10) or in a counterclockwise direction (22.11 and 22.12), as is clearly illustrated in FIGS. 11A and 11B, which show, respectively, the initial positions (FIG. 11A) and the final positions (FIG. 11B) corresponding to FIGS. 10A and 10E respectively.

From the aforegoing, it will readily be understood:

a) that a first elementary path t1 exhibits a direction parallel to the thickness of the wall of the braid 11, that is to say orthogonal to the coaxial collars of threads 9, so that a thread 8, which is wound off from a spool 7 displaced in accordance with such an elementary path t1, exhibits a section which, in projection orthogonal to the axis T—T, is likewise orthogonal to said coaxial collars;

b) that a plurality of elementary paths t1 may be concatenated in succession, to vary the length of said section of said thread 8 orthogonal to said collars;

c) that a second elementary path t2 exhibits a direction circumferential in relation to said braid 11 and to said coaxial collars of threads 9, so that a thread 8, which is wound off from a spool 7 displaced in accordance with such an elementary path t2, exhibits a section which, in projection orthogonal to the axis T—T, is likewise circumferential to said braid;

d) that a plurality of elementary paths t2 may be concatenated in succession, to vary the length of said circumferential section of thread 8; and e) that a third elementary path r permits the association of a first path t1 with a second path t2 and vice versa, so that it is possible to cause a thread 8 to follow a continuous path composed of sections corresponding to the elementary paths t1 and to the elementary paths t2, associated inter se.

Thus, said first elementary paths t1 are utilized to displace the braiding threads 8 between the parallel threads 9 of the coaxial collars, while said second elementary paths t2 are utilized to form the braiding proper with said threads 8. It will be noted that, as the latter are all circumferential in relation to the braid (and not oblique in relation to the thickness of the wall of the braid, as in European Patent EP-A-0 113 196), said braiding threads 8 of each one of the two grids of the braid 11 form an assembly of superposed layers in which said braiding threads 8 are parallel from one layer to the next.

In the machine diagrammatically described with reference to FIGS. 1 to 5, it has been implicitly assumed that the support 1 of the multiindented wheels 2 is planar. On the other hand, FIGS. 12 and 13 show diagrammatically a machine according to the present invention in which said support is formed by a fixed cylindrical collar 30, of horizontal axis H—H.

In the embodiment of FIGS. 12 and 13, the traversing guidance tubes 3 and the spindles 6, carrying the spools 7, are mounted on the internal wall 31 of the collar 30 (for the sake of clarity, the multiindented wheels 2 are not shown). Of course, in this case, it is necessary, in the construction and the assembly of the multiindented wheels 2, the pinions 15 and the tubes 3, to take account of the circular concavity of the internal wall 31.

The mandrel 4 is disposed coaxially with the collar 30 and the spools 10 of the threads 9 are mounted in creels 32 dispersed laterally (not shown in FIG. 12).

The machine of FIGS. 12 and 13 further includes, downstream of the mandrel 4, a cutting device 33 to split the braid 11 longitudinally, that is to say parallel to the threads 9 of said braid. The result is accordingly a plane web 34, which can be wound onto a drum 35. Thus, such a plane web 34 constitutes a plane armoring including parallel threads 9 distributed on a plurality of superposed levels (each level corresponding to a coaxial collar of threads 9 of the braid 11), as well as two grids of threads 8 passing about said parallel threads 9, which are such that, in each one of said grids of threads 8, the latter are parallel to one another and that the general directions of the threads 8 of these two grids of threads are symmetrical with respect to one another in relation to the parallel threads 9.

FIG. 14 illustrates a variant of the machine of FIGS. 12 and 13, in which variant the traversing guidance tubes 3 and the spindles 6 are mounted on the internal wall 41 of a collar 40, of vertical axis V—V. The mandrel 4 is then disposed vertically, coaxially with the collar 40. This FIG. 14 again shows the creels 32 and the cutting device 33. The latter permits the production, from the braid 11, of the plane web 34 which is wound onto the drum 35.

FIGS. 15, 16 and 17 illustrate, respectively, three examples of mesh for the braid 11 or the armoring 34, in the simplified case where there are only two coaxial collars (or two superposed levels) of parallel threads 9. In these figures, which substantially correspond to sections orthogonal to said parallel threads 9, it has been assumed that threads 8 of the two grids of oblique threads were visible in the plane of the section. FIGS. 18, 19 and 20 illustrate the surface appearance of the braidings corresponding, respectively, to the meshes of FIGS. 15, 16 and 17.

Moreover, FIGS. 21 and 22 illustrate, in superposition upon a plan diagram of the quincuncial arrangement of the multiindented wheels 2 and the parallel threads 9, two possibilities of paths Tr1 and Tr2 for the spindles 6 carrying the threads 8, for the purpose of obtaining the braiding mesh illustrated in FIGS. 15 and 18. It is easily verified that each one of the paths Tr1 and Tr2 is composed only of sequences of the first, second and third elementary paths t1, t2 and r, as illustrated in FIGS. 7B, 9B and 11B.

FIG. 23 diagrammatically illustrates, in perspective, with a cutaway, a braid 11 or an armoring 34 corresponding to another example of braiding with the mesh of FIGS. 15 and 18. This braiding includes seven superposed levels of threads 9 and, if the direction of the threads 9 is taken to be equal to 0°, it further comprises three laps of threads 8 at +α° and three laps of threads 8 at −α°. The angle α is, for example, equal to 60°.

In the modified embodiment of the braiding of FIG. 23, which modified embodiment is illustrated by FIG. 24, some parallel threads 9 have been replaced by tubes 50, which are parallel to one another and to said threads 9. The result of this is a structure comparable with a honeycomb structure.

FIGS. 25 and 26 illustrate, in a view comparable with FIGS. 21 and 22, two possibilities of paths Tr3 and Tr4 for the spindles 6 carrying the threads 8, for the purpose of obtaining the braiding mesh of FIGS. 16 and 19.

FIG. 27 illustrates, in a view comparable with FIGS. 21, 22, 24 and 25, paths Tr5 for the spindles 6, for the purpose of obtaining the braiding mesh of FIGS. 17 and 20.

Finally, FIG. 28 illustrates, in a view comparable with FIGS. 21, 22, 24, 25 and 27, paths Tr6 for the spindles 6, for the purpose of obtaining the braiding variant incorporating seven levels which is illustrated in diagrammatic perspective in FIG. 29.

It will be readily understood from the aforegoing that, given the large number of possible combinations of the first, second and third elementary paths t1, t2 and r, the examples of braiding meshes, of braided structures and of paths of spindles which are shown by FIGS. 15 to 27 are only possibilities among others, and that these examples do not restrict the possibilities of the present invention.

What is claimed is:

1. A machine for the construction of a braid (11) including a set of identical multiindented wheels (2), which are mounted on a fixed support (1) and driven in rotation to cause the circulation of spindles (6) carrying spools (7) of braiding elements (8), said multiindented wheels being disposed in parallel and equidistant lines (L—L), wherein:

in said set of multiindented wheels:
the multiindented wheels (2) belonging to a line are spaced from one another, so that two consecutive multiindented wheels belonging to one and the same line cannot cooperate directly with one another;
a multiindented wheel (2) belonging to one line is disposed between two multiindented wheels belonging to an adjacent line and cooperates with said two multiindented wheels; and in the spaces between the consecutive multiindented wheels of a line, there are provided passages (3) for longitudinal elongate elements (9) of said braided tubular structure.

2. The machine as claimed in claim 1, wherein within said spaces between the consecutive multiindented wheels of a line there are further provided rhomboidal needles (17) of controlled orientation which are intended either to cause said spindles (6) to pass from one multiindented wheel to another belonging to an adjacent line, or to maintain said spindles on their respective multiindented wheels.

3. The machine as claimed in claim 2, wherein said needles (17) are coaxial with said passages (3) for the elongate elements (9).

4. The machine as claimed in claim 2, wherein said needles (17) are controlled in orientation by a linkage gear (19, 20).

5. A machine as claimed in claim 2, wherein, at any given moment:

all the needles (17) associated with a line of multiindented wheels (2) are parallel to one another and thus have a common orientation; and the common orientations of the needles (17) associated with two adjacent lines of multiindented wheels (2) are symmetrical with respect to one another in relation to said lines.

6. The machine as claimed in claim 1, wherein said fixed support (1) of the multiindented wheels is planer.

7. The machine as claimed in claim 1, wherein said fixed support (31, 41) of the multiindented wheels (2) is cylindrical.

8. The machine as claimed in claim 7, wherein the axis (H—H) of said fixed cylindrical support (31) is horizontal.

9. The machine as claimed in claim 7, wherein the axis (V—V) of said fixed cylindrical support (41) is vertical.

10. The machine as claimed in claim 1, which includes cutting means (33) for longitudinally splitting said braid (11).

* * * * *